United States Patent [19]

Schreiber et al.

[11] 3,928,644

[45] *Dec. 23, 1975

[54] NOVEL VEGETABLE FLAVORED FOODSTUFF AND VEGETABLE FLAVOR COMPOSITIONS CONTAINING 2-PHENYL-4-PENTENAL AND/OR DIMETHYL ACETAL THEREOF

[75] Inventors: William Lewis Schreiber, Jackson; Manfred Vock, Locust, both of N.J.; Edward Joseph Shuster, New York, N.Y.; Alan O. Pittet, Atlantic Highlands, N.J.

[73] Assignee: International Flavors & Fragrances Inc., New York, N.Y.

[ * ] Notice: The portion of the term of this patent subsequent to Dec. 3, 1991, has been disclaimed.

[22] Filed: Oct. 2, 1974

[21] Appl. No.: 511,429

Related U.S. Application Data

[63] Continuation-in-part of Ser. No. 283,651, Aug. 25, 1972, Pat. No. 3,852,482.

[52] U.S. Cl. ............... 426/535; 426/536; 426/537; 426/538

[51] Int. Cl.$^2$ ......................................... A23L 1/226
[58] Field of Search ..................... 426/65, 536, 538

[56] References Cited

UNITED STATES PATENTS

| | | | |
|---|---|---|---|
| 3,582,360 | 1/1971 | van Praug et al. | 426/65 |
| 3,694,232 | 9/1972 | Hall et al. | 426/65 |
| 3,829,504 | 8/1974 | Hall et al. | 426/65 UX |
| 3,852,482 | 12/1974 | Schreiber et al. | 426/65 |

*Primary Examiner*—Joseph M. Golian
*Attorney, Agent, or Firm*—Arthur L. Liberman, Esq.; Harold Haidt, Esq.

[57] ABSTRACT

Foodstuff flavor and aroma augmenting compositions containing a quantity of 2-phenyl-4-pentenal and/or its dimethyl acetal sufficient to alter the vegetable aroma and/or taste characteristics of said foodstuff, methods for preparing same, and foodstuff containing 2-phenyl-4-pentenal and/or its dimethyl acetal.

7 Claims, No Drawings

NOVEL VEGETABLE FLAVORED FOODSTUFF AND VEGETABLE FLAVOR COMPOSITIONS CONTAINING 2-PHENYL-4-PENTENAL AND/OR DIMETHYL ACETAL THEREOF

This application is a continuation-in-part of U.S. Patent Application 283,651 filed on Aug. 25, 1972 now Patent No. 3,852,482 issued Dec. 3, 1974.

BACKGROUND OF THE INVENTION

The present invention relates to novel methods and compositions using a 2-phenyl-4-pentene derivative, specifically, 2-phenyl-4-pentenal and/or its dimethyl acetal to alter the flavor and/or aroma of foodstuffs by imparting thereto a vegetable flavor or enhancing or altering a vegetable flavor already present in said foodstuff.

There has been considerable work performed relating to substances which can be used to impart flavors to various consumable materials. These substances are used to diminish natural materials some of which may be in short supply, and to provide more uniform properties in the finished product.

Tomato flavors, potato flavors, oniony flavors and vegetable flavors in general are particularly desirable for many uses in consumable articles.

3-Phenyl pentenals have been suggested in U.S. Pat. No. 3,694,232 for use in cocoa flavors whereby notes characteristic of milk chocolate are provided. 3-Phenyl-4-pentenal is indicated to cause the chocolate beverage to have a fuller, richer sweet milk chocolate flavor. U.S. Pat. No. 3,582,360 issued on June 1, 1971 discloses certain 2-phenyl-2-alkenals as being useful for preparing flavoring compositions and food compositions, particularly those having chocolate or cocoa flavors and/or aroma qualities. Thus, for example, the compound 5-methyl-2-phenyl-2-hexenal is indicated therein to alter imitation cocoa flavor so as to provide a more natural cocoa flavor and impart a character of bitter chocolate.

Acetals are shown to be useful in fragrance formulations at Column 2, lines 50–65 of U.S. Pat. No. 3,636,113. Such acetals have the structure:

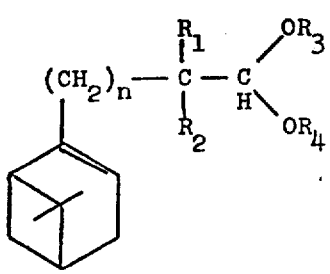

wherein $R_1$ and $R_2$ are either hydrogen or lower alkyl; wherein $R_3$ and $R_4$ are the same or different lower alkyl groups, and wherein n is 1 or 2 and lower alkylene cyclic acetals having the structure:

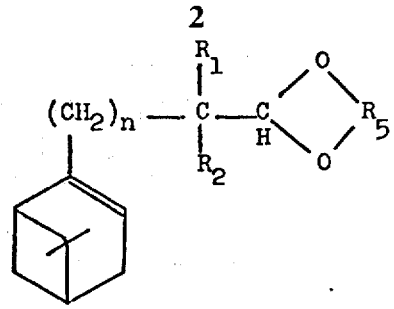

wherein $R_5$ is lower alkylene.

In United States application Ser. No. 43,555 now U.S. Pat. No. 3,694,232 issued on Sept. 26, 1972 mentioned above, mention is made of the diethyl acetal of 3-phenyl-4-pentenal and the diethyl acetal of 3-phenyl-3-pentenal; but only as intermediates for producing 3-phenyl-3-pentenal and 3-phenyl-2-pentenal form 3-phenyl-4-pentenal.

In West et al. "Synthetic Perfumes: their Chemistry and Preparation", published by Edward, Arnold & Co., London, England in 1949, on page 315 cinnamaldehyde dimethyl acetal is stated to "have a fine cinnamon-cassia odor which renders it useful in some Chanel-like fancy perfume and in oriental types like Tabac Blond and Fleur de Tabac". Cinnamaldehyde diethyl acetal is also reported. These materials have the following structures:

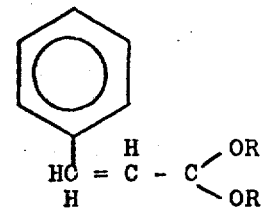

wherein R is methyl or ethyl.

Cinnamaldehyde diethyl acetal is reported in "Perfume and Flavor Chemicals (Aroma Chemicals)" by S. Arctander (published by the author in Montclair, New Jersey 11969) and having a "faint but fresh green slightly spicy oily sweet odor and a mild and oily sweet taste." Arctander goes on to state: "since this acetal — like most other acetals — is unstable under mildly acid conditions it finds little if any use in flavor compositions". In addition, Arctander also reports cinnamaldehyde 2,4-dihydroxy-4-methyl-pentane acetal as "soft, tenacious, natural, cinnamon type odor not nearly as harsh as cinnamic aldehyde yet rich and lasting as aldehyde itself". Cinnamic aldehyde dimethyl acetal is also reported by Arctander and with reference to this acetal Arctander states: "It should be noted that pure, aldehyde-free acetal is practically colorless and carries little or no odor similarily to the aldehyde". The ethylene glycol acetal of cinnamic aldehyde is indicated by Arctander to be useful in flavor compositions, such as all spice, cassia, cinnamon, clove and various spice blend and it is stated by Arctander to have a sweet spicy cinnamon all spice taste not quite as sweet as the aldehyde. It should be noted that cinnamic aldehyde ethylene glycol acetal is on the GRAS list and has been given F.E.M.A. No. 2287.

The cinnamic aldehyde and acetals thereof set forth in the prior art are not considered to impart certain desired qualities to consumable materials which the 2-phenyl-4-pentenal or dimethyl acetal thereof of this invention is capable of doing as more specifically described below.

THE INVENTION

It has now been discovered that novel solid and liquid foodstuff and flavoring compositions having tomato or potato or cooked vegetable characteristics may be provided by the utilization of 2-phenyl-4-pentenal and/or its dimethyl acetal.

The flavor and aroma properties of 2-phenyl-4-pentenal and its dimethyl acetal are more particularly described as follows:

i. 2-Phenyl-4-Pentenal

Aroma: Green, styrallyl, tomato with green, cooked fruity nuance.

Taste: At 1 ppm, 2 ppm, and 5 ppm has a characteristic cooked tomato taste. At 10 ppm has a chocolate-like taste with a sweet dried fruit-like nuance; also, sweet green and nut-like.

ii. 2-Phenyl-4-Pentenal Dimethyl Acetal

Aroma: A low keyed greenish note having additional nuances which can be described as hay-like, floral, spicy and having an initial impact of fruity and apple seed aromas.

Taste: At 2 ppm and 5 ppm has a sweet green vegetable low floral and cooked tomato taste. At 10 ppm, the taste is more turnip-like. At 1 ppm has a slight green spicy character.

Accordingly, the 2-phenyl-4-pentenal and/or the dimethyl acetal thereof of our invention has been found to provide or alter or enhance certain flavor and aroma notes, not heretofore provided in currently available cooked vegetable (e.g., cooked tomato) flavor formulations.

As used herein in regard to flavors, the term "alter" in its various forms means supplying or imparting a flavor character or note to an otherwise bland, relatively tasteless substance, or augmenting the existing flavor characteristic where a natural flavor is deficient in some regard, or supplementing the existing flavor impression to modify its quality, character or taste.

As used herein the term "foodstuff" includes both solid and liquid ingestible materials which usually do, but need not, have nutritional value. Thus, foodstuffs include meats, gravies, soups, convenience foods, beverages, dairy products, candies, vegetables, cereals, soft drinks, snacks and the like. 2-Phenyl-4-pentenal is prepared by first forming the enamine of morpholine and phenylacetaldehyde. The resulting enamine is then reacted with an allyl halide (such as allyl chloride or allyl bromide whereby the allyl moiety is added to the alpha-carbon atom of the enamine; and an immonium salt is formed. Addition of the allyl halide is carried out in the presence of a solvent preferably acetonitrile and in the absence of any catalyst or in the presence of a potassium or sodium iodide catalyst. Both the reaction to form the enamine of phenylacetaldehyde and the reaction to form the immonium salt are carried out at reflux conditions. The resulting immonium salt is then hydrolyzed whereby the free aldehyde, the 2-phenyl-4-pentenal is produced. 2-Phenyl-4-pentenal may also be prepared according to the procedure of Elkik, Bulletin de la Societe Chimique de France 1969 No. 3, pages 903–910 (Title: "Mecanisme d'aloeylation des enamines").

The 2-phenyl-4-pentenal dimethyl acetal of this invention is prepared by first preparing the 2-phenyl-4-pentenal free aldehyde. This free aldehyde is then converted to the corresponding dimethyl acetal by reaction with a methanol in the presence of an acid catalyst, such as paratoluene sulfonic acid, hydrochloric acid or source therefor, such as acetyl chloride. The 2-phenyl-4-pentenal may also be converted to the dimethyl acetal by reaction of a trimethyl orthoformate with 2-phenyl-4-pentenal.

The aforementioned reaction sequence is illustrated as follows:

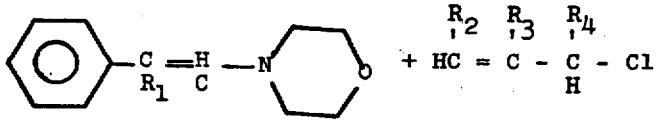

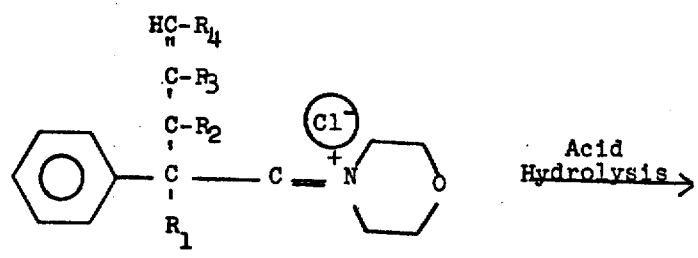

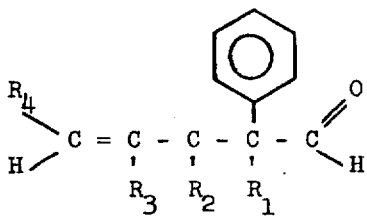

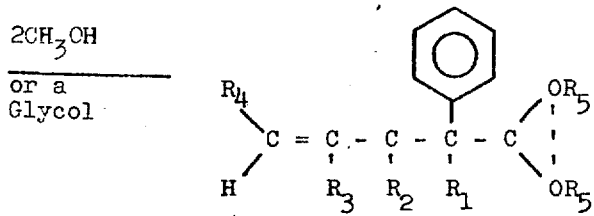

wherein $R_1$, $R_2$, $R_3$ and $R_4$ are $C_1$ - $C_3$ lower alkyl and $R_5$ is methyl.

When the 2-phenyl-4-pentenal and/or its dimethyl acetal of this invention is used as a food flavor adjuvant, the nature of the co-ingredients included with the 2-phenyl-4-pentenal and/or its dimethyl acetal in formulating the product composition will (i.e., as a foodstuff per se or alternatively as a flavoring composition adapted to be added to a foodstuff at some subsequent point of time) serve to alter the organoleptic characteristics of the ultimate foodstuff treated therewith.

Substances suitable for use herein as coingredients or flavoring adjuvants are well known in the art for such use being extensively described in the relevant literature. Apart from the requirement that any such material be "ingestibly" acceptable, and thus non-toxic or otherwise non-deleterious, nothing particularly critical resides in the selection thereof. Accordingly, such materials, which may in general be characterized as flavoring adjuvants or vehicles comprise broadly, stabilizers, thickeners, surface active agents, conditioners, flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6,di-tertiary-butyl-4-methyl phenol), propyl gallate and the like, sequestrants, e.g., citric acid.

Thickener compounds include carriers, binders, protective colloids, suspending agents, emulsifiers and the like, e.g., agaragar, carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches pectins, and emulsifiers, e.g., mono- and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcuma and the like; firming agents such as aluminum sodium sulfate, calcium chloride and calcium gluconate; texturizers; anticaking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Flavorants and flavor intensifiers include organic acids, e.g., fatty saturated acids, unsaturated acids and amino acids; alcohols, e.g., primary and secondary alcohols; esters, carbonyl compounds including aldehydes and ketones as well as lactones; cyclic organic materials including benzene derivatives; isocyclics; heterocyclics, such as furans, particularly pyridines, pyrazines (particularly monoalkyl, dialkyl, trialkyl and tetraalkyl substituted pyrazines) and the like, sulfur-containing materials including thiazoles, disulfides, thiols, sulfides, aldehydes, (for example, 3-phenyl-4-pentenal, 3-phenyl-3-pentenal, 3-phenyl-2-pentenal, 2-phenyl-2-pentenal, and 2-phenyl-3-methyl-2-butenal; disulfides and the like; so-called flavor potentiators such as monosodium glutamate, guanylates, inosinates, natural and synthetic flavorants such as vanillin, ethyl vanillin, diacetyl, phenethyl-2-furoate, maltol, natural gums and the like; spices, herbs, essential oils, and extractives including "bitterness principles" such as theobromin, caffein, naringin and other suitable materials creating a bitter effect.

The specific flavoring adjuvant selected for use may be either solid or liquid, depending upon the desired physical form of the ultimate product, i.e., foodstuff, whether simulated or natural, and should, in any event, be capable of providing an environment in which the 2-phenyl-4-pentenal and/or dimethyl acetal thereof of our invention can be dispersed or admixed to provide a homogeneous medium. In addition, selection of one or more flavoring adjuvants as well as the quantities thereof will depend upon the precise organoleptic character desired in the finished product, thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 2-phenyl-4-pentenal and/or dimethyl acetal thereof employed in a particular instance can vary over a relatively wide range whereby to achieve desired organoleptic effects having reference to the nature of the product. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected the effective, i.e., sufficient to alter the organoleptic characteristics of the parent composition, whether foodstuff per se or flavoring composition. Thus, the use of insufficient quantities of the 2-phenyl-4-pentenal and/or dimethyl acetal thereof will, of course, substantially vitiate any possibility of obtaining the desired results while excess quantities prove needlessly costly and in extreme cases may disrupt the flavor-aroma balance, thus providing self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of 2-phenyl-4-pentenal and/or dimethyl acetal thereof ranging from a small but effective amount, e.g., 1.0 part per million up to about 20 parts per million by weight based on total composition are suitable. Concentrations in excess of the maximum quantities stated are not normally recommended since they fail to provide commensurate enhancement of organoleptic properties. In those instances wherein the 2-phenyl-4-pentenal and/or dimethyl acetal thereof is added to the foodstuff as an integral component of a flavoring composition, it is, of course, essential that the total quantity of flavoring composition employed be sufficient to yield an effective 2-phenyl-4-pentenal and/or dimethyl acetal thereof concentration in the foodstuff product.

Food flavoring compositions prepared in accordance with the present invention preferably contain the 2-phenyl-4-pentenal and/or dimethyl acetal thereof in concentrations ranging from about 20% to 100% by weight, based on the total weight of said flavoring composition.

The compositions described herein can be prepared according to conventional techniques well known in the art for such purposes. Thus, liquid products as typified by cake batters, egg nog, "tomato-juice-drink", "oyster sauce" and tomato catsup can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 2-phenyl-4-pentenal and/or dimethyl acetal thereof with, for example, gum arabic, gum tragacanth, carrageenan and the like, and thereafter, spray-drying the resultant mixture whereby to obtain the particulate solid product. Pre-prepared flavor mixes in powder form, e.g., cocoa mix may be obtained by mixing the dried solid components, e.g., milk solids, sugar and the like and the 2-phenyl-4-pentenal of our invention in a dry blender until the requisite degree of uniformity is achieved.

It is presently preferred to combine the 2-phenyl-4-pentenal and/or its dimethyl acetal with the following adjuvants:

Vanillin;
Allyl Caproate;
Citral;
Amyl Butyrate;
2(n-pentyl) Thiazole;
2(i-butyl) Thiazole;
2(i-propyl) Thiazole;
2(n-propyl) Thiazole;
Methional;
4-Methylthiobutanal;
2-Ethyl-3-acetyl Pyrazine;
Tetramethyl Pyrazine;
2-Methyl Pyrazine;
2-Trans Hexenal; and
Maltol The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 2-Phenyl-4-Pentenal

Into a 500 liter flask equipped with a stirrer, thermometer, water separator, reflux condenser, heating mantle and addition funnel, the following materials are added:

| | |
|---|---|
| 8.8 grams | Morpholine |
| 250 ml | Benzene |
| 12.0 grams | Phenylacetaldehyde |

The mixture is refluxed with water separation until no more water is produced from the reaction mixture (period of time: 4 hours). The benzene is then evaporated leaving a yellow solid which is then dissolved in 200 ml acetonitrile. The acetonitrile acts as a solvent.

The resulting enamine reaction product having the structure:

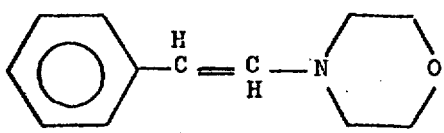

dissolved in acetonitrile is then admixed with 9.0 ml of allyl chloride. 0.25 Grams of KI (solid) is added and the reaction mixture is then refluxed with stirring for a period of 12 hours. The acetonitrile solvent is then removed by means of adding the reaction mixture to a rotary evaporator. The reaction mass which now contains the immonium salt having the structure:

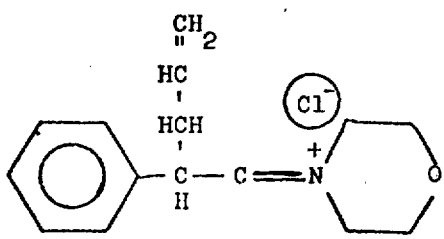

is placed in a 500 ml three-neck flask equipped with stirrer, thermometer and reflux condenser. 300 ml of 1.5M aqueous hydrochloric acid is added and the reaction mass is stirred for a period of three hours. The reaction mass is then placed in a one liter separatory funnel and extracted with three 200 ml portions of diethyl ether. The diethyl ether is washed successively with 200 ml portions of water and saturated sodium carbonate. The resulting ether extract is then dried over anhydrous sodium sulfate and evaporated thereby yielding a residual red oil. This red oil is rushed over at 0.2 ml mercury pressure yielding 1.70 grams of yellow oil. This material is then passed through a 10 feet × ⅜ inches SE-30 GLC column. IR, mass spectral and NMR analyses confirm the structure of this material as 2-phenyl-4-pentenal.

The NMR data for this compound is as follows:

| ppm | | | Interpretation |
|---|---|---|---|
| 9.65 | (d) | 1H | Formyl proton |
| 7.62–7.08 | (m) | 5H | Aryl protons |
| 5.87–5.46 | (m) | 1H | Olefinic proton |
| 5.06–4.88 | (m) | 2H | Olefinic protons HC=O |
| 3.54 | (t) | 1H | Aryl—C—CH₂— H |
| 2.92–2.28 | (m) | 2H | Aryl—C—CH₂—C=C |

EXAMPLE II

2-Phenyl-4-pentenal prepared according to the process set forth in Example I is added to a commercial instant tomato soup mix ("Tomatoncreme Suppe," C. H. Knorr, Heilbrenn, West Germany) at the rate of 2 ppm (based on the weight of the soup as ready to eat, produced by adding 80 gm of the dry soup mix to 1000 ml of water and then bringing the resulting mixture to a boil. A second "control" is prepared which is identical to the initial sample except for the absence of the 2-phenyl-4-pentenal.

A four member panel of flavorists compared the control to the soup containing the 2-phenyl-4-pentenal. All four members of the panel indicated a strong preference for the tomato soup containing the 2-phenyl-4-pentenal. All four members of the panel indicated that the soup containing the 2-phenyl-4-pentenal includes a fresh tomato note which is not present in the soup prepared without using the 2-phenyl-4-pentenal.

It was unexpected that although, by itself, 2-phenyl-4-pentenal has a cooked tomato note (on dilution in water), when the soup was prepared as described above a fresh tomato character was achieved.

EXAMPLE III

Potato Flavor

A potato flavoring material is prepared by admixing the following ingredients:

| Ingredient | Parts by Weight |
|---|---|
| Diacetyl (1% solution) | 0.2 |
| Furfural | 0.2 |
| 2-Acetyl-3-ethyl pyrazine (1% solution) | 1.0 |
| 2-ethyl-3-methyl-pyrazine | 4.0 |
| Methional | 2.0 |
| 2-Phenyl-4-pentenal | 1.0 |
| Ethanol | 91.6 |

A "bench panel" of five individuals compared the above formulation with one not containing any 2-phenyl-4-pentenal but identical in all other respects. The formulations were compared at the rate of 10 ppm in water solutions. It was concluded that the 2-phenyl-4-pentenal imparted to the flavor of fresh raw potato like taste which causes the said formulation to be suitable for use in the production of potato dumplings.

EXAMPLE IV

Preparation of 2-Phenyl-4-Pentenal Dimethyl Acetal

300 Mg of 2-phenyl-4-pentenal produced in Example I is dissolved in 10 ml of methanol and 0.5 grams of 2,2-dimethoxy propane. One drop of acetyl chloride is added to the reaction mixture and the mixture is maintained at 25°C for 5 hours. The solvent is then evaporated and the resulting residue is taken up in 20 ml of petroleum ether. Petroleum ether solution is filtered to remove a small amount of white solid and is then evaporated down leaving a residue which is a light yellow oil. The light yellow oil is determined to have a purity greater than 97% by means of gas liquid chromatography and is determined by means of IR, NMR and mass spectral analyses to be 2-phenyl-4-pentenal dimethyl acetal.

The NMR data for this compound is as follows:

| ppm | | | Interpretation |
|---|---|---|---|
| 7.20 | (m) | 5H | Aromatic protons |
| 5.80–5.40 | (m) | 1H | Olefinic proton |
| 5.00–4.80 | (m) | 2H | Olefinic proton |
| 4.40 | (d) | 1H | Acetal proton |
| 3.34 | (s) | 3H | CH₃O— |
| 3.20 | (s) | 3H | CH₃O— |
| 2.92 | (m) | 1H | Benzylic proton |
| 2.50 | (m) | 2H | Aryl—C—CH₂—C=C |

EXAMPLE V

2-Phenyl-4-pentenal dimethyl acetal is added directly to a food product prior to processing and canning. The following illustrates the beneficial flavor effect when 2-phenyl-4-pentenal dimethyl acetal is added directly to several food products just prior to their consumption:

i. In tomato soup at 10–20 ppm:
   Creates a distinctive flavor characteristics in the product; Has an aroma characterized as sweet, green, vegetable, raw carrot, cooked, tomato and turnip-like.
ii. In blended vegetable sauce at approximately 30 ppm:
   Brings up turnip and raw carrot notes but depresses celery note and blends flavor in a desirable manner thereby providing an increase in turnip and cooked tomato flavor.
iii. In vegetable soup at 40 ppm:
   Imparts a fresh vegetable flavor; The turnip and raw carrot and cooked tomato notes give the entire vegetable flavor a very full body.
iv. In bean tomato sauce at approximately 20 ppm:
   Modifies the flavor by reducing the harsh character of the tomato spice mixture while at the same time adding turnip and raw carrot notes and developing the typical cooked tomato note.

The levels of concentration of the 2-phenyl-4-pentenal dimethyl acetal may be reduced by 25% when 2-isobutyl thiazole is added at the rate of 5 ppm in addition to the 2-phenyl-4-pentenal dimethyl acetal to the various products set forth above. It should be understood further that noticeable differences in the flavor are discernable at other concentrations. At much higher levels, the flavor becomes objectionable and overly rancid testing (e.g., 200—300 ppm).

EXAMPLE VI

2-Phenyl-4-pentenal is added directly to a food product prior to processing and canning. The following illustrates the beneficial flavor effect when 2-phenyl-4-pentenal is added directly to several food products just prior to their consumption.

i. In blended vegetable sauce at approximately 30 ppm:
   Brings up turnip and raw carrot notes but depresses celery note and blends falvor in a desirable manner thereby providing an increase in turnip and cooked tomato flavor.
ii. In vegetable soup at 40 ppm:
   Imparts a fresh vegetable flavor; The turnip and raw carrot and cooked tomato notes give the entire vegetable flavor a very full body.
iii. In bean tomato sauce at approximately 20 ppm:
   Modifies the flavor by reducing the harsh character of the tomato spice mixture while at the same time adding green fresh notes and developing the "cooked" tomato note to a "fresh" tomato note.

The levels of concentration of the 2-phenyl-4-pentenal may be reduced by 25% when 2-isobutyl thiazole is added at the rate of 5 ppm in addition to the 2-phenyl-4-pentenal to the various products set forth above. It should be understood further that noticeable differences in the flavor are discernable at other concentrations. At much higher levels, the flavor becomes objectionable and overly rancid tasting (e.g., 200-300 ppm).

EXAMPLE VII

Use of 2-Phenyl-4-Pentenal to Enhance the Vegetable Flavor of Vegetarian Vegetable Soup 2-Phenyl-4-pentenal is added at the rate of 2 ppm to condensed Vegetarian Vegetable Soup (Shop-Rite brand). One liter of water is added to 1 liter of soup and thoroughly admixed. The resulting mixture is then simmered (200°F) for a period of 10 minutes. The resulting soup is compared by a bench panel with soup which has no 2-phenyl-4-pentenal added thereto. The soup having the 2-phenyl-4-pentenal added thereto is unanimously preferred as having a more vegetable-like spicy taste with a fuller mouth feel and better aroma.

EXAMPLE VIII

Use of 2-Phenyl-4-Pentenal to Enhance the Potato Flavor of Mashed Potatoes

2-Phenyl-4-pentenal is added at the rate of 1 ppm to the ready-to-eat mashed potato preparation (French's Idaho Mashed Potatoes). The mashed potatoes are prepared for human consumption by heating just to boiling 2 cups water, ⅔ cup milk, ¾ teaspoon salt and 2 tbsp. butter, removing the resulting mixture from heat and gradually stirring the contents of one 4 oz. package of the ready-to-eat mashed potatoes into the mixture. The mixture is then whipped briskly until light and fluffy. The 2-phenyl-4-pentenal increases the earthy potato notes and covers the "cardboard-like" offnotes present. When compared with the same mashed potatoes not containing the 2-phenyl-4-pentenal, the mashed potatoes containing the 2-phenyl-4-pentenal are preferred by a five-member bench panel.

What is claimed is:

1. A process for altering the organoleptic properties of a foodstuff which comprises adding thereto a small but effective amount to enhance a vegetable flavor or to impart thereto a vegetable flavor of 2-phenyl-4-pentene derivatives selected from the group consisting of 2-phenyl-4-pentenal and 2-phenyl-4-pentenal dimethyl acetal.

2. The process of claim 1 wherein, in addition, to the 2-phenyl-4-pentene derivative there is added to the foodstuff an adjuvant selected from the group consisting of:

Maltol;
2-Trans hexenal;
Vanillin;
Allyl caproate;
Citral;
Amyl butyrate;
2(n-propyl)thiazole;
2(n-pentyl) thiazole;
2(i-butyl) thiazole;
Methional;
2-Ethyl-3-acetyl pyrazine;
4-Methylthiobutanal;
2-Methyl pyrazine; and
Tetramethyl pyrazine and mixtures thereof.

3. The process of claim 1 wherein the foodstuff is a potato product.

4. The process of claim 1 wherein the 2-phenyl-4-pentene derivative is 2-phenyl-4-pentenal dimethyl acetal.

5. A process for altering the organoleptic properties of a foodstuff which comprises adding thereto a small but effective amount to enhance a vegetable flavor or to impart thereto a vegetable flavor of 2-phenyl-4-pentenal.

6. The process of claim 5 wherein, in addition to the 2-phenyl-4-pentenal, there is added to the foodstuff an adjuvant selected from the group consisting of:

Maltol;
2-Trans hexenal;
Vanillin;
Allyl caproate;
Citral;
Amyl butyrate;
2(n-propyl) thiazole;
2(n-pentyl) thiazole;
2(i-butyl) thiazole;
Methional;
2-Ethyl-3-acetyl pyrazine;
4-Methylthiobutanal;
2-Methyl pyrazine; and
Tetramethyl pyrazine and mixtures thereof.

7. The process of claim 5 wherein the foodstuff is a potato product.

* * * * *